United States Patent [19]

Martens et al.

[11] Patent Number: 4,555,906
[45] Date of Patent: Dec. 3, 1985

[54] DEAERATOR PRESSURE CONTROL SYSTEM FOR A COMBINED CYCLE STEAM GENERATOR POWER PLANT

[75] Inventors: Alan Martens, Berwyn; Gerry A. Myers, Swarthmore, both of Pa.

[73] Assignee: Westinghouse Electric Corp., Pittsburgh, Pa.

[21] Appl. No.: 664,639

[22] Filed: Oct. 25, 1984

[51] Int. Cl.⁴ .................................... F01K 13/02
[52] U.S. Cl. .................................... 60/660; 60/657
[58] Field of Search .................. 60/646, 652, 657, 660, 60/667

[56] References Cited

U.S. PATENT DOCUMENTS 3,955,358  5/1976  Martz et al. .............. 60/39.18 B
3,965,675  6/1976  Martz et al. .............. 60/39.18 B
4,311,013  1/1982  Kuribayashi et al. ............ 60/646

FOREIGN PATENT DOCUMENTS 93912  7/1980  Japan .......................... 60/657

Primary Examiner—Stephen F. Husar
Attorney, Agent, or Firm—C. M. Lorin

[57] ABSTRACT

In a combined cycle steam generation power plant, until steam extraction can be used to reheat the deaerator, the economizer and/or the pegging recirculation are controlled so as to track the pressure upwards of the autocirculation reheater from the low pressure evaporator with a certain lag in pressure, and to establish pressure in the deaerator on the decreasing trend of the autocirculation reheater at a slower rate and without lowering below a minimum pressure so as to prevent the occurrence of bubbling and cavitation effect.

9 Claims, 7 Drawing Figures

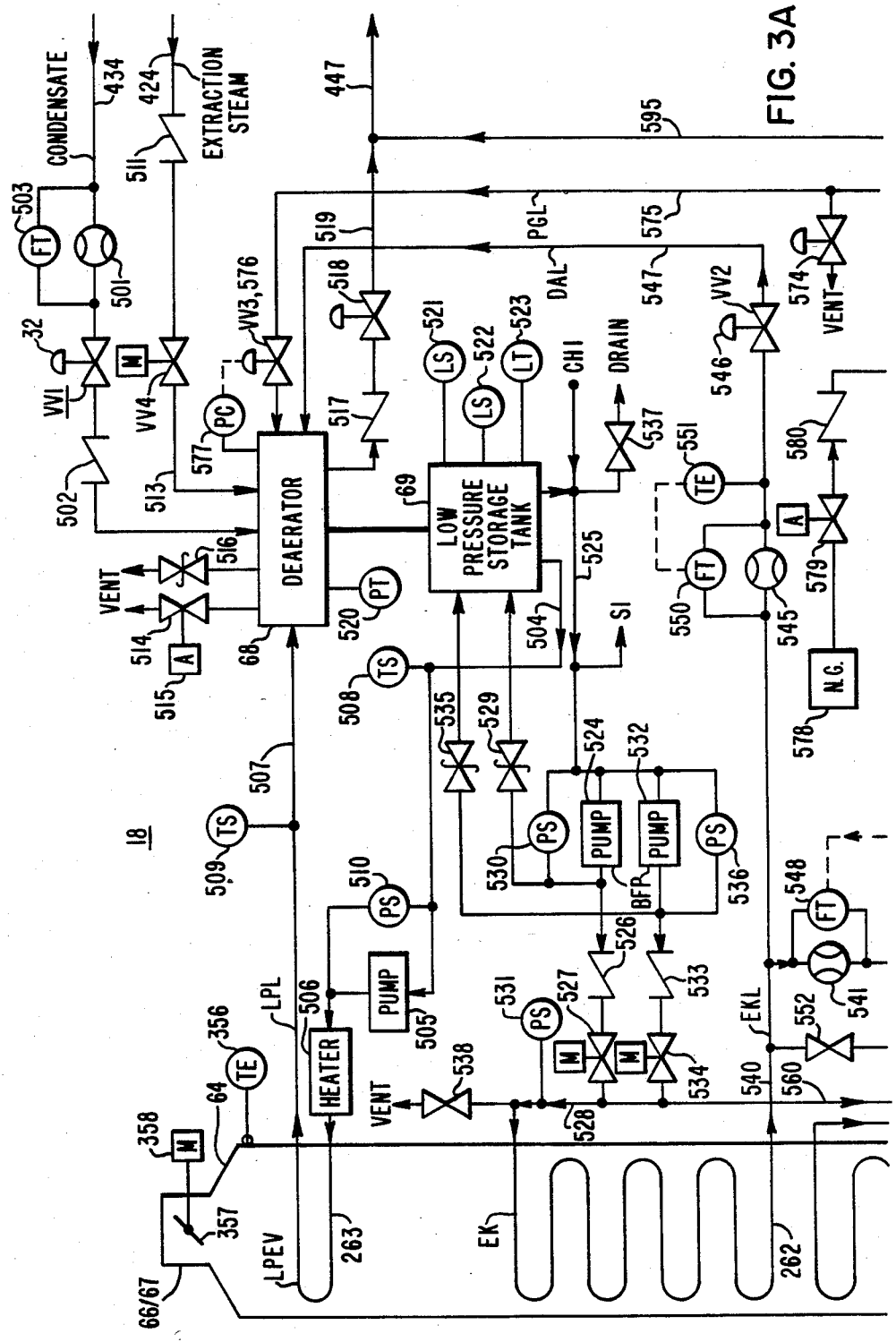

DEAERATOR PRESSURE CONTROL SYSTEM FOR A COMBINED CYCLE STEAM GENERATOR POWER PLANT

BACKGROUND OF THE INVENTION

The present invention relates to a combined cycle steam generator power plant, and more particularly to improved pressure and fluid control for the heat recovery steam generator associated with such combined cycle steam generator power plant.

A heat recovery steam generator, typically includes a deaerator supplied with feedwater from the condensate of the condenser directed by a feedwater pump into the degassing portion of the deaerator. The degassed fluid is then supplied to the heat exchangers of the heat recovery steam generator. It is known to use such heat exchangers partially, in order to (1) heat the fluid admitted in the deaerator and (2) provide suitable pressure and temperature in the deaerator to permit degassing. These are the two basic conditions of operation of a deaerator, as generally known. The heat recovery steam generator coupled to the steam generator units of a steam generator power plant, however, introduces to a considerable degree elements of complexity which tend to obscure the two above-stated essential functions of the deaerator. The purpose of the present invention is to maintain and enhance the pressure and temperature parameters of the deaerator while satisfying the other conditions of operation of the heat exchangers and feedwater lines in a combined cycle steam generator power plant.

It is known from U.S. Pat. No. 3,965,675 to control the flow of fluid to the deaerator from at least two heat sources selected from the heat recovery steam generator, in particular from the economizer and the high pressure evaporator tubes. It is also known at high loads to use steam extraction from the turbine as the main source of heat for the deaerator. The prior art concern, though, has been limited to how best to heat up the deaeration, e.g., the first of the two above-mentioned operative conditions of the deaerator. The present invention, while using at least two sources of heat, has for primary purpose to maintain an operational pressure in the deaerator, while selecting one or more of predetermined heat sources.

For the purpose of the description of the present invention which is to follow, U.S. Pat. Nos. 3,955,358 and No. 3,965,675 of L. F. Martz et al. are hereby incorporated by reference.

As explained in the prior art, feedwater from the condenser is passed through, and degassed by, the deaerator which, besides a degassing portion, also includes a storage tank for accumulated liquid from which feedwater is pumped into the economizer heat exchanger, then to the high pressure evaporator and finally to the superheater tube. As a result, water is heated up and, at the last stage is converted into steam under conditions of temperature and pressure adequate to supply superheated steam to the steam turbine. While these heat sources are of primary importance when the water system is cold, as soon as the turbine has reached full load, or, say 80% thereof, steam extracted from the turbine can be used most economically to heat the deaerator up and maintain degassing operation. In a combined cycle system, a combustion turbine is coupled to the heat recovery steam generator to provide, with the generated kilowatts, the heat necessary to make steam. Afterburners are also provided with injection of air and fuel for selective control of pressure and temperature in the heat recovery steam generator.

Since optimization, in the selection of a heat source to provide heat in the deaerator at various stages of operation of the steam turbine, calls for several heat sources which are at different levels of temperature and pressure, a problem arises as to how and when to couple a particular heat source without impairing degassing operation. More specifically, the deaerator portion proper and the associated low pressure storage tank hold a vapor phase and a liquid phase in a phase-to-phase relationship requiring a pressure in the vapor phase above the pressure of saturation, otherwise the column of fluid through the tank down to the boiler feed pump will be so low as to cause the generation of bubbles, and the apparition of cavitation effects on the active surface of the pump. This phenomenon is known to entail detrimental effects on the blades and impair the longevity of the pump. On the other hand, should the pressure of a heat source coupled with the deaerator through a heat exchanger be too low, it may become impossible to couple another heat source when required, and obtain gassification, if the operative pressure of such other heat source is higher than the incoming heat source. This is the problem encountered with the extracted steam derived from the turbine. Since it takes quite a long time before the turbine has reached the full load condition which allow use of extracted steam as a heat source for the deaerator, other sources of energy must be used before that time. At the early stage, one heat source is particularly favorable in the heat recovery steam generator, namely the low pressure evaporator since it is always present and available by auto-circulation to collect heat about to be wasted anyhow at the exhaust thereof. At the start, though, most heat available is heat being collected by the low pressure evaporator. Later in the starting process, from cold feedwater charged in the system steam is not being generated yet, but the economizer is taking progressively an increasing share of the hot gasses blown through the heat recovery steam generator. When the high pressure steam drum starts to build up steam, the high pressure evaporator is used as an additional, or alternative, heat source for the deaerator. This is known as pegging. Finally, once the superheater can supply generously steam to the steam turbine, extraction steam becomes the main and only source of heat for the deaerator. Nevertheless, steam extraction comes at a definite time which is relatively late and independent from the decision to couple the economizer and/or high pressure evaporator heat sources. In the meantime, it is desirable to maintain an operative pressure in the deaerator, and such operative pressure must be at least the one required when the succeeding heat source has to come in. This is the problem which is solved with the deaerator pressure control system according to the present invention.

SUMMARY OF THE INVENTION

In a combined cycle steam generation power plant, a deaerator control system is associated with the deaerator of the heat recovery steam generator of the power plant. The deaerator control system according to the invention selects an optimum heat source in accordance with the following preferred priority order: low pressure evaporator, steam extraction from the steam turbine, economizer recirculation, high pressure evaporator drum steam, which is an order based on cost and availability. In so doing, the deaerator control system provides for adaptive control of the pressure in the deaerator in relation to the actual pressure therein and a predetermined pressure setpoint for either one of the economizer and drum steam circulated fluid, so as to maintain pressure in the deaerator at a minimum level compatible with the anticipated pressure of saturation of the steam to be extracted from the steam turbine. Accordingly, the turbine control system is able to control the admission of steam to the deaerator under such first pressure condition established in the deaerator by the deaerator pressure control system according to the invention.

BRIEF DESCRIPTION OF THE DRAWINGS

FIGS. 3A and 3B show in detail various fluid connections between gas turbine, steam turbine and the heat recover steam generator, as typical in a combined cycle power plant;

DESCRIPTION OF THE PREFERRED EMBODIMENT

Figure 1:
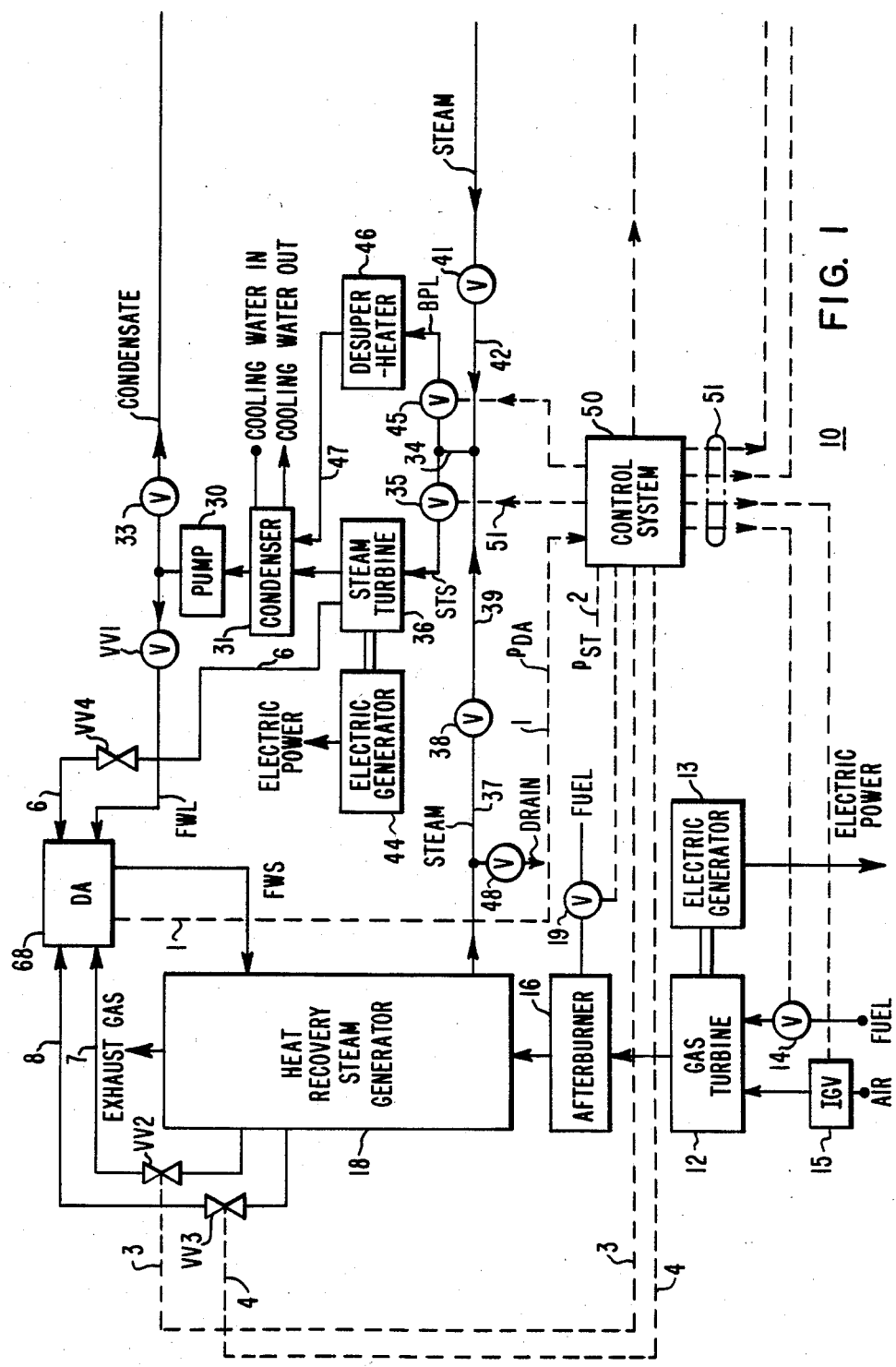
FIG. 1 is a diagrammatic representation of a typical combined cycle power plant including the deaerator pressure control system according to the invention.

Referring to FIG. 1, there is shown a functional block diagram of a combined cycle power generation plant including typically two gas turbines and heat recovery steam generators, only one gas turbine 12 with the associated electric generator 13 and one heat recovery steam generator (HRSG) 18 being shown for clarity and simplification. The gas turbine is coupled with an afterburner 16 and the heated gas released from combustion is admitted to pass through the HRSG 18 and exhaust thereafter. Steam generated by HRSG 18 via line 37, valve 38, lines 39 and 34, valve 35 and steam supply line STS is fed into the steam turbine 36 which is driving an electric generator 44 and is fluidly coupled to its condenser 31. An alternate route for the steam is a bypass, by line BPL and bypass valve 45, to a de-superheater 46 going by line 47 to the condenser 31. All the valves, 14 for the fuel into the gas turbine, 19 for the fuel in the afterburner 16, 35 in the steam supply line STS and 45 in the bypass line BPL, are controlled by lines 51 from the control system 50 which otherwise also pertain to other control sequences in the plant operation, such as generation of power, of steam, start-up and stop, feedwater flow, etc., as generally known. See for instance the incorporated by reference U.S. Pat. Nos. 3,955,358 and 3,965,675 of L. F. Martz et al.

In accordance with the present invention, the deaerator DA which is part of the heat recovery steam generator 18, (shown by block 68 in FIG. 1) normally receives condensate fluid pumped by condensate pump 30 from the condenser 31 and fed via feed line FWL into the deaerator. Degassed liquid accumulated in the storage tank of the deaerator (not shown) is supplied by line FWS to the economizer within HRSG 18, as generally known. A boiler feed pump (not shown) circulates, through a valve VV2, heated feedwater via line 7 from the economizer (within HRSG 18) into the vapor phase portion of the deaerator 68 and saturated steam, from the high pressure steam drum, is recirculated in a fashion known as "pegging" by a pump (not shown) through a valve VV3, via line 8, into the vapor region of the deaerator 68. Within the control system 50, or associated with it, control is provided by line 3 onto valve VV2, and by line 4 onto valve VV3. Valve VV4 is allowing fluid flow in line 6 for the extracted steam. Actual pressure $p_{DA}$ in the deaerator is sensed, and the representative signal is supplied by line 1 to the control system 50. A pressure setting signal $p_{ST}$ is supplied on line 2 to the control system 50.

Figure 2:
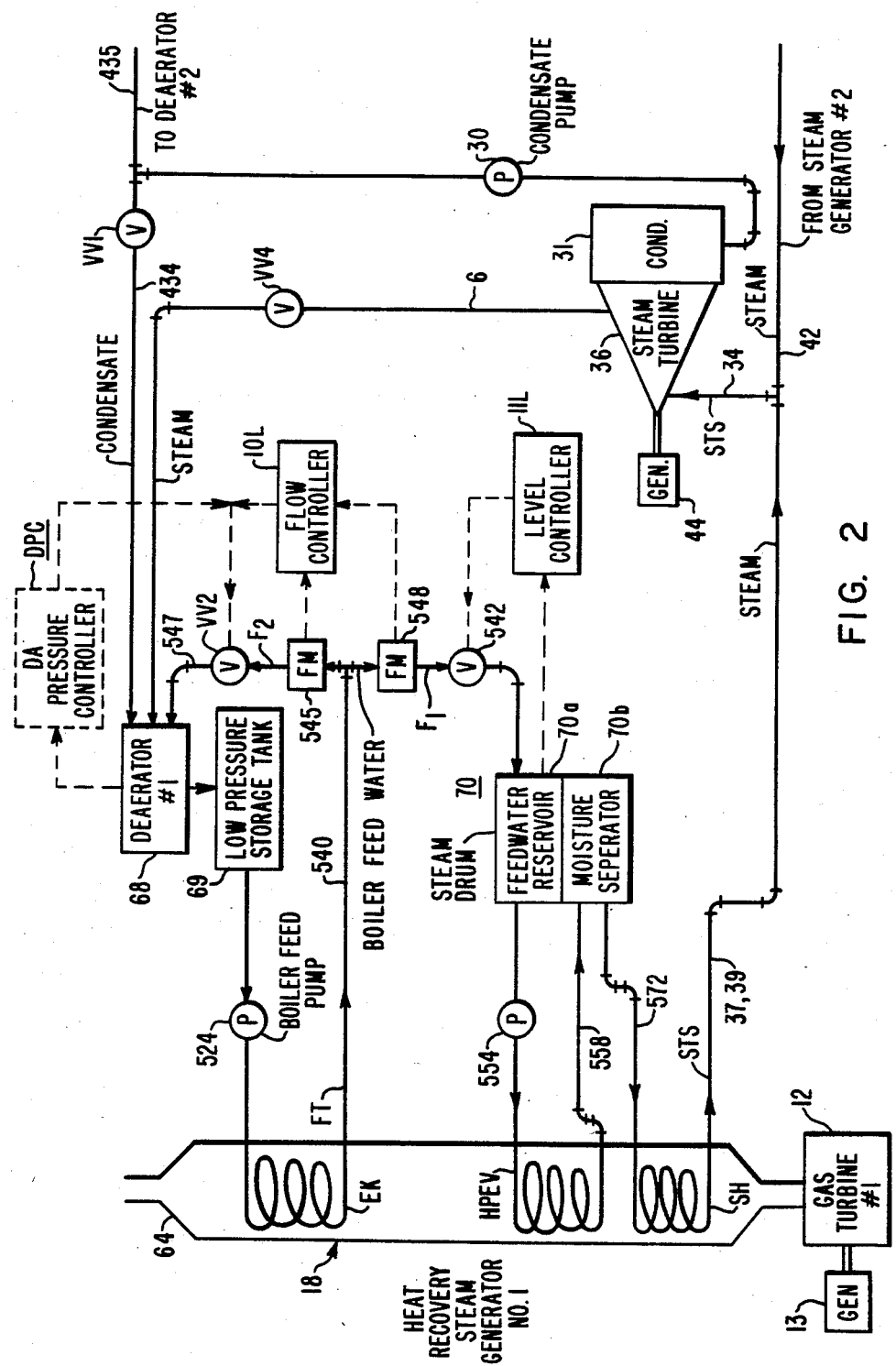
FIG. 2 is a schematic representation of the heat recovery steam generator system associated with the power plant of FIG. 1, including extracted steam and heat source coupling with the deaerator under pressure control according to the invention.

Referring to FIG. 2, the heat recovery steam generator 18 is shown to include an economizer EK (262 in the patents incorporated by reference), a high pressure evaporator HPEV (261 in the patents) and a superheater SH (260 in the patents). The deaerator is shown to include a section 68 for the vapor phase where degassing takes effect and a low pressure storage tank 69 in which condensed vapor accumulates as degassed water. The boiler feed pump 524 extract feedwater from tank 69 and feeds it into the economizer EK. By line 540, boiler feedwater is derived from the economizer and after passing through valve VV2 it enters via line 547 into deaerator portion 68. By line 540, via valve 542, the main flow of boiler feedwater from the economizer is going to the saturated vapor portion 70a of the steam drum 70. The HPEV section receives saturated vapor from 70a, circulated by pump 554 into the tubing for heat exchange therein, and the vapor is passed by line 558 within the moisture separator section 70b of steam drum 70. From the steam drum, vapor is passed by line 572 into the superheater SH (260 in the patents) where it becomes superheated steam. In the aforementioned patents reference is made to a flow controller 10L and a level controller 11L which, respectively, control flow into the deaerator from the economizer and the liquid level in the steam drum with respective flowmeters 545 and 548. These features are not part of the present invention, although they may be used concurrently with it, as any of the sequence steps imparted to the fluid at various locations by control system 50 of FIG. 1.

Figure 3B:
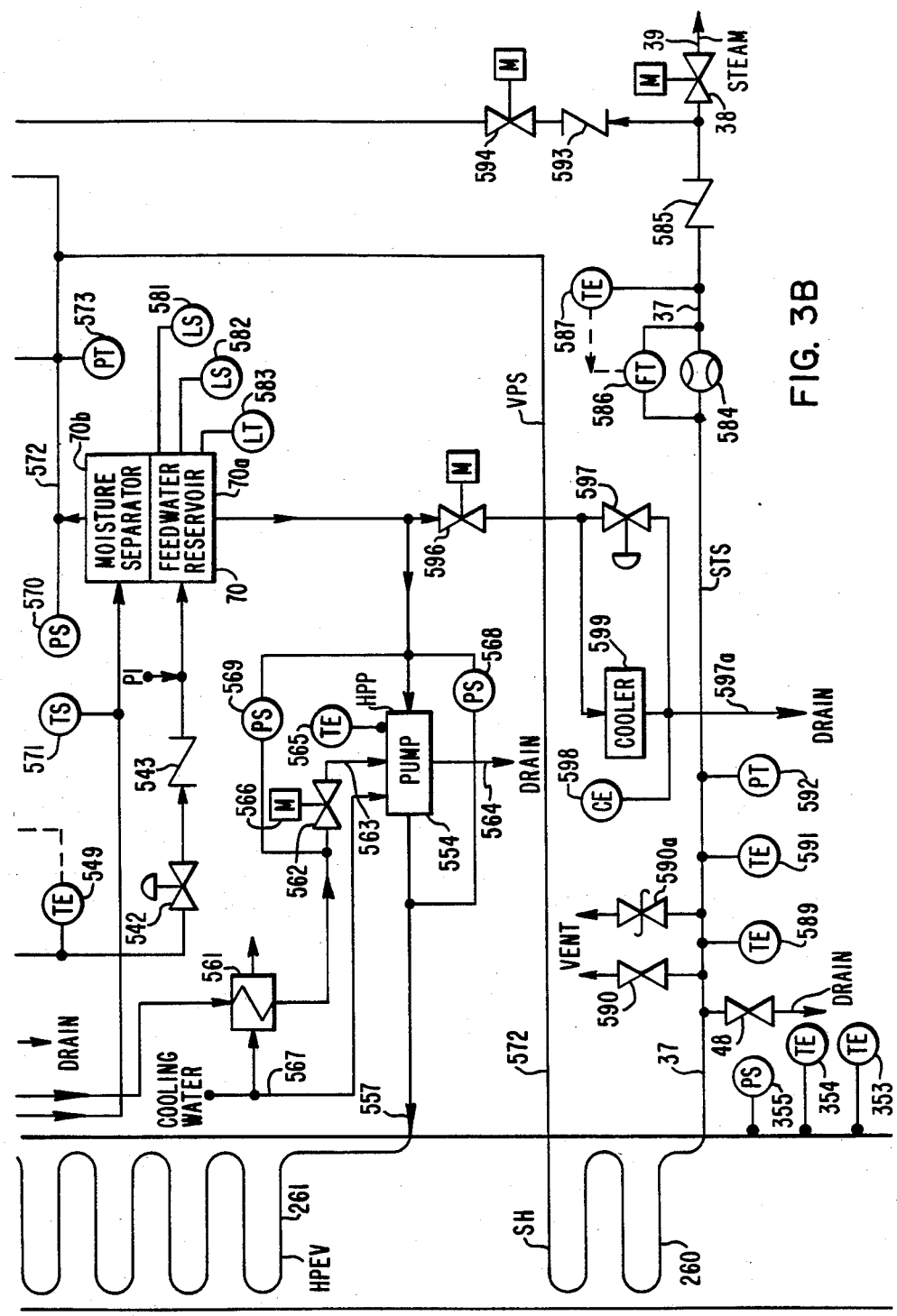

Referring to FIGS. 3A, 3B, fluid interconnections between gas turbine, steam turbine and heat recovery steam generator are represented with specific devices such as pumps, valves, flow transmitters, flow elements, temperature elements, pipes, coolers or heaters. These have been described specifically as part of the overall steam power generation system, in U.S. Pat. No. 3,965,675, for instance, which has been incorporated by reference. Relevant to the present invention are the following:

Fluid flow of condensate is by line 434 (FWL in FIG. 4, thereafter) via controlled valve VV1, and stop valve 502 to deaerator vaporization 68.

Extraction steam flow is by line 424 (line 6 in FIG. 4 thereafter) via stop valve 511, valve VV4 and line 513 to the deaerator vapor section 68.

Autocirculation of fluid is effected via line 504 from the low pressure storage tank 69, which is a section of the deaerator, to the low pressure evaporator 263 (LPEV in FIG. 4 thereafter) and return by line 507 (LPL in FIG. 4 thereafter) to the vapor section 68 of the deaerator.

Figure 4:
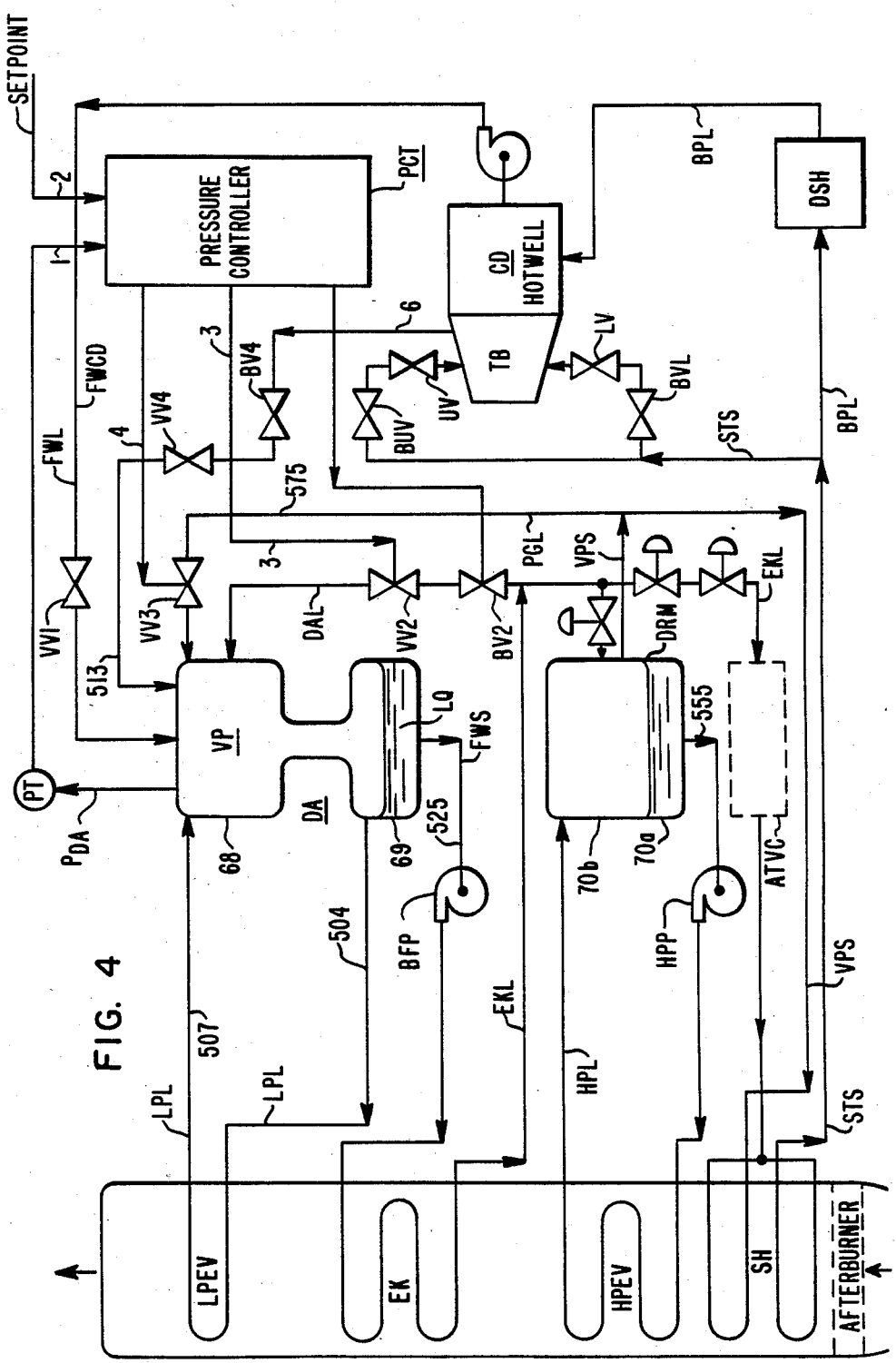
FIG. 4 is a block diagram of the circuitry of FIGS. 3A and 3B emphasizing the four heat sources that are, or can be, coupled with the deaerator under control of the deaerator pressure control system according to the invention.

Fluid flow circulation of water is performed by pumps 524, 532 (BFP in FIG. 4 thereafter) from the low pressure storage tank 69, via line 525, stop valves 526, 533, controlled valves 527, 534 and line 528, to the economizer 262 (EK in FIG. 4, thereafter). The economizer feeds into line EKL (540 in the patents) and the supply goes via flow element 541 (flow transmitter 548 is associated thereto providing an electrical signal indicative of the feedwater flow rate through flow element and the sensing temperature element 549), feedwater control valve 542 and stop valve 543, to the feedwater reservoir 70a of the drum 70. A portion of the feedwater from line 540 is derived via recirculation control valve 546 (VV2 in FIG. 4) and by line 547 (DAL in FIG. 4) to the deaerator 68.

Pegging is effected from the moisture separator portion 70b of the drum 70, via line 572 (which normally goes to the superheater SH) in derivation therefrom by line 575 (PGL in FIG. 4) and via control valve VV3, 576 connected to a corresponding steam inlet of deaerator 68.

Extraction steam flow is schematized in FIG. 4 by line 6, check valve BV4, valve VV4 and line 513 to the vapor phase VP in portion 68 of deaerator DA.

Autocirculation from the low pressure evaporator LPEV is schematized by loop LPL including line 504 from an outlet from the vapor phase in portion 69 of deaerator DA, and line 507 to an inlet of portion 68 thereof.

The economizer recirculation loop is in FIG. 4 schematized by feedwater supply FWS, line 525 and boiler feed pump BFP draining degassed water from the bottom of the low pressure storage tank 69 of deaerator DA. The input of heat to build pressure in the deaerator is by line EKL via check valve BV2, control valve VV2 and line DAL to an inlet in section 68 of deaerator DA.

Pegging, in FIG. 3B, derived by lines 572, 575 from moisture separator 70b is supplied from a loop schematized by line 555 extracting fluid from the feedwater reservoir portion 70a of the drum DRM under suction of pump HPP which goes to the high pressure evaporator HPEV and from there, to the moisture separator portion 70b by line HPL. In FIG. 4, pegging is symbolized by lines VPS, PGL and valve VV3.

FIG. 4 also represents in schematic form, turbine TB and the associated condensate hot well CD. Steam is supplied from superheater SH by line STS, via upper check valve BVV and control valve UV, as well as via lower check valve BVL and control valve LV to the turbine. As generally known, in operation, steam can be bypassed directly to condenser CD from line STS, via line BPL and de-superheater DSH. Also, fluid from the economizer in line EKL, normally goes to an attemperator section ATVC, then, to the superheater, as conventionally done.

Still referring to FIG. 4, according to the present invention, a signal representing the pressure $p_{DA}$ in the deaerator (sensed by pressure transducer 520 of FIG. 3A) is inputted by line 1, together with a pressure setpoint signal provided on line 2, into a pressure controller PCT, in order to control adaptively (1) via line 3 a valve VV2 inserted in line DAL for controlling fluid flow to the deaerator from the economizer, (2) via line 3 a valve VV3 inserted in line PGL for controlling fluid flow to the deaerator from the drum by pegging. A valve VV4 is provided for admitting steam flow of extraction steam to the deaerator once the turbine has the proper steam. The control system (50 in FIG. 1) generally provides for valve operations and fluid flows for the overall steam generation combined cycle operation of the plant. The circuitry of pressure controller PCT and the associated control lines are shown in block diagram by FIG. 6.

Figure 5:
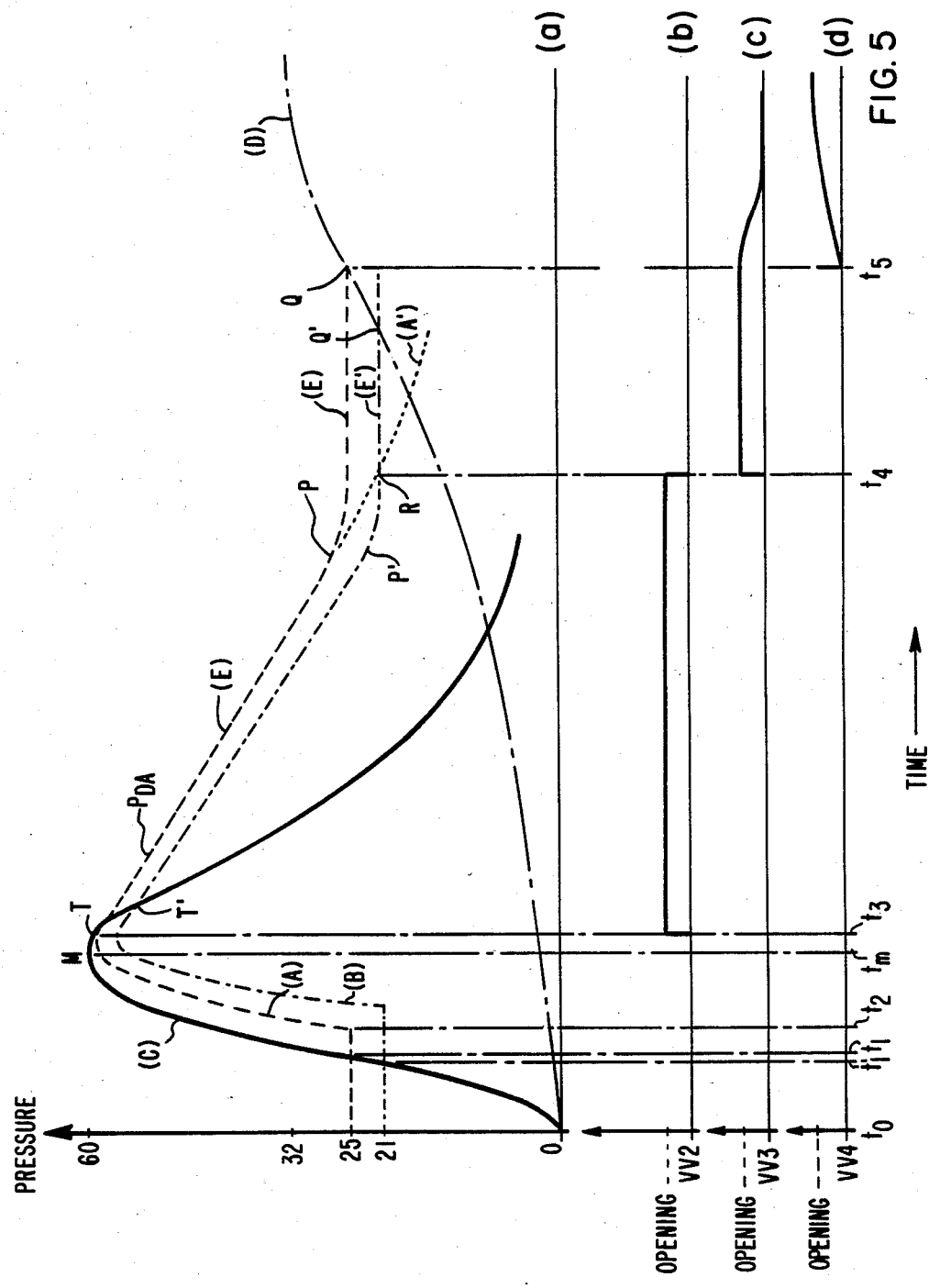
FIG. 5 provides curves which illustrate as a function of time how and when becomes possible the intervention of the three controllable heat sources illustrated in FIG. 4.

FIG. 5 provides curves illustrating the operation of the control valves VV2 and VV3 as a function of time in accordance with the present invention. Valves VV2, VV3 are adaptively controlled to maintain proper pressure in the deaerator, so as to enable proper operation with valve VV4 when turbine extraction occurs.

Deaerator pressure control according to the invention will now be explained by reference to the curves of FIG. 5 and the circuitry of FIG. 6.

The function of the deaerator is to provide, at the outlet of the low pressure storage tank 69, water having the required temperature, and water which has been degassified when sprayed upon through the vapor phase VP before falling as droplets down into the liquid phase of collecting tank 69. In order to achieve degassing of the feedwater from the condenser, it is necessary to keep the two phases (vapor and liquid) of the deaerator at a temperature high enough, while maintaining the pressure between the two phases above the pressure of saturation of water at such temperature. To this effect it is required to supply heat and to maintain the right pressure. It is known from U.S. Pat. No. 3,965,675 to heat up the deaerator from one or more of four sources of heat in the boiler, or heat recover steam generator of a combined cycle generation plant, namely the low pressure evaporator (on auto circulation), the economizer, the high pressure evaporator and steam extracted from the turbine (the latter under forced circulation).

Normally, the low pressure evaporator takes up only the remnant of energy toward the low end of the boiler. However, when the boiler is operating at low inlet gas temperatures (at the start when generation of steam has no build-up yet) or at high superheater outlet steam pressure (when steam is being mostly bypassed from the superheater to the condenser, away from the turbine), high heat generation will take place in the low pressure evaporator. This situation might lead to overpressure in the deaerator. As will be explained hereinafter, pressure control in accordance with the present invention will avoid the undesirable effects by: (1) maintaining automatically the deaerator pressure at the level required; (2) maintaining the deaerator pressure below the condensate head curve, thereby maintaining a proper level in the deaerator; (3) controlling heater venting from the superheater turbine in the bypass in a modulated manner, thereby to prevent sudden pressure fluctuations.

Besides such exceptional situations, in the normal operation of a combined cycle installation plant, e.g. from the start to full steam generation, the pressure in the deaerator may be seriously affected by the selective use of one source of energy or the other. It is known for instance that at high loads (80% or more) the steam in the turbine constitutes an infinite source of energy for the deaerator. When the load is varied in the high range, it becomes necessary to regulate the pressure in the deaerator by steam extraction flow control as a function of the load for proper deaerator operation. In contrast, when the deaerator is supplied with energy from a source other than the low pressure evaporator or the steam extraction, it is coupled to a finite energy source, which may vary extensively in the course of the boiler operation. This is a critical period because the pressure in the deaerator may fall instantaneously below the required level. If this occurs, the instantaneous reduction of the column of liquid in the low pressure tank will cause bubbling and gas flashing will ensue on the active surfaces of the circulating pump, causing permanent damage to the pump. In order to avoid this, it is necessary to prevent any fall of pressure in the deaerator while the economizer is being used.

Referring to FIG. 5, assuming the combined cycle steam power generation unit is being started, autocirculation with low pressure evaporator LPEV is taking place alone among the other heat sources of the heat recovery steam generation section. Under the intense heat at the end of the boiler, pressure is building up quickly translated by the front line of curve (C) of FIG. 5 which is the actual pressure in the deaerator portion 68 at that time. The sharp increase from zero pressure reaches a maximum M typically at time $t_m$ for 60 psia. As start-up proceeds, more heat is being transferred in the boiler to the other heat exchangers, such as the economizer EK, the high pressure evaporator HPEV and, when the load becomes noticeable on the turbine, the superheater SH. Accordingly, less heat manifests itself in the LPEV rgion, and the pressure at the inlet of the autocirculation loop decreases relatively fast as shown by the back line curve (C) beyond the peak M.

Referring to curve (D) of FIG. 5, when the control system 50 (FIG. 1) of the plant opens the check valve 511 (FIG. 3) and valve VV4 (512 in FIG. 3) is admitting extraction steam from line 424 and by line 513 in the deaerator, to be effective the pressure for degassing may be in the deaerator anywhere between actual pressure of extraction (typically 32 psi at point Q on curve (D)) up to a limit value (typically 110 psi) at which pumping from the condenser would be impaired. Without extraction of steam, though, active pressure in the deaerator could be as low as 10 psi, typically, and this will be sufficient to drive air off the sprayed fluid in the deaerator. With the economizer, however, pumping of the heated water requires an operative pressure which, before reaching Q is, on account of pumping limitations, less than 32 psi, but at least 25 psi, typically. With pegging the lowest pressure of operation is somewhat 3 or 4 psi lower, namely at 21 psi, typically. Accordingly, as illustrated in FIG. 5, when the economizer is pumping heated water into the deaerator, this would occur from the initial level marked illustratively at 25 psi ordinate. Curve (A) illustrates the control setpoint for the economizer before it can intervene by replacing the low pressure evaporator as a heat source for the deaerator. According to the present invention, the flow of fluid from the economizer into the deaerator is controlled by the shown setpoint cure (A) so that the pressure build-up remain offset below curve (C), until at point T and time $t_3$ where and when it intersects curve (C), namely beyond peak M thereof. This differential relationship between the initial pressures of admission allows to maximize the use of heat from the low pressure evaporator in the first phase after start-up while preparing for a transfer as a leading heat source to the economizer, namely at time $t_3$ when the curves (C) and (A) intersect. Also, according to the present invention, while the low pressure evaporator rather rapidly acquires energy but soon provides less energy (BTU per pound), as shown by the relatively sharp decrease of curve (C), fluid flow from the additional heat source provided by the economizer is controlled by a setpoint curve which has to become a dominating factor and which will place the economizer in a position (after the peak) to maintain pressure decrease at a much slower rate, as illustrated by envelope (E) in FIG. 5. This is important because as earlier stated, such a fall of pressure could reduce the pressure at the boiler feed pump inlet to such an extent that, at the pressure of saturation of the vapor and liquid in presence in the deaerator, bubbles would form and cavitation effects could take place, thereby causing permanent damage to the pump. This condition is prevented because the slow rate of pressure change maintains essentially equal temperature at both the deaerator and the pump inlet. The slowdown shown by curve (E) will prevent this while insuring smooth transition from the peak M to the initial level of 25 psi, at Q, when extraction steam at time $t_5$ is being admitted. While the occurrence of a sharp rise of the low pressure evaporator energy due to high temperature inlet gases in the region of the boiler has been shown in FIG. 5 during start-up, to be followed by a rapid fall of pressure requiring the intervention of the economizer, such intervention may also be required in the course of normal operation. For instance should steam be bypassed to the condenser from the superheater at high superheater outlet steam pressure due to steam turbine trip, curve (D) beyond instant $t_5$ would experience a dip. Should this occur, according to the invention, valve VV2 will open restoring the heat from the economizer, into the deaerator. Consequently pressure in the deaerator will be caused to increase. The same can be said of the "pegging" loop (curve E') which, according to the invention, operates as a backup, should the economizer loop happen to fail. Adaptive control by setpoint is such that, should the low pressure evaporator not be controlling, an apparent pressure is created to replace what otherwise would be a sudden pressure decrease due to increased flow of condensate or reduced LPEV output. In other words, by adaptive control, the pressure control setpoint of curve (A) will be forced to track curve (C) with a sharp rise matching the rise of curve (C) in a manner similar to the one shown in FIG. 5. Also, whenever such pressure increase due to the low pressure evaporator as a heat source would subside abruptly. thus in a manner similar to the decrease shown by the solid line in FIG. 5, a damping effect on such pressure decrease from the economizer will be introduced by the circuit tracking control of curve (C), in a manner similar to the one shown by envelope (E) in FIG. 5.

It is also observed that a sudden fall of pressure while the economizer is used as a heat source might occur. In order to prevent the effect of such occurrence on the deaerator and on the boiler feed pump, "pegging" is used as a back-up heat source, as illustrated by curve (B). Control of the pressure of admission in the deaerator, if pegging is used, is by controlling valve VV3. According to the present invention, a second setpoint curve is provided for controlling valve VV3 so as to follow curve (B) slightly behind curve (A) in time, e.g. also at a fast rate before the peak M is reached, and at a slower rate once the slope of the curve has become negative, whereby after the intersection at T' with curve (C), an envelope E' parallel to curve (E) is followed. Should, at any time during normal operation, pressure along curve (A) fall below curve (B), immediately pegging will take over so as to maintain at least the pressure which is prescribed by curve (B). For instance, as illustrated in FIG. 5, when at R curve (A) would follow curve (A') by going below curve (E'), then, at time $t_4$, pegging intervenes and valve VV3 is controlled so as to maintain the pressure as assigned to it in accordance with curve (E'). It is understood that adaptive control, according to the present invention, establishes characteristics such as (E), or alternatively (E'), during any period such as between $t_3$ and $t_5$, namely until the extraction steam is allowed to take over with valve VV4. Curve (b) shows a curve representing positioning of valve VV2 after time $t_3$ when the economizer is in use, while curve (c) represents positioning of valve VV3 after time $t_4$ assuming pressure of the economizer follows (A') rather than (E), and at point R falls below the setpoint for "pegging" on curve (E'). Then VV2 will shut down and VV3 will open at time $t_4$. Curve (d) is illustrative of valve positioning of VV4 after extraction steam is admitted, and such positioning beyond instant $t_5$ is effected as a function of the turbine load as shown by curve (D).

Figure 6:
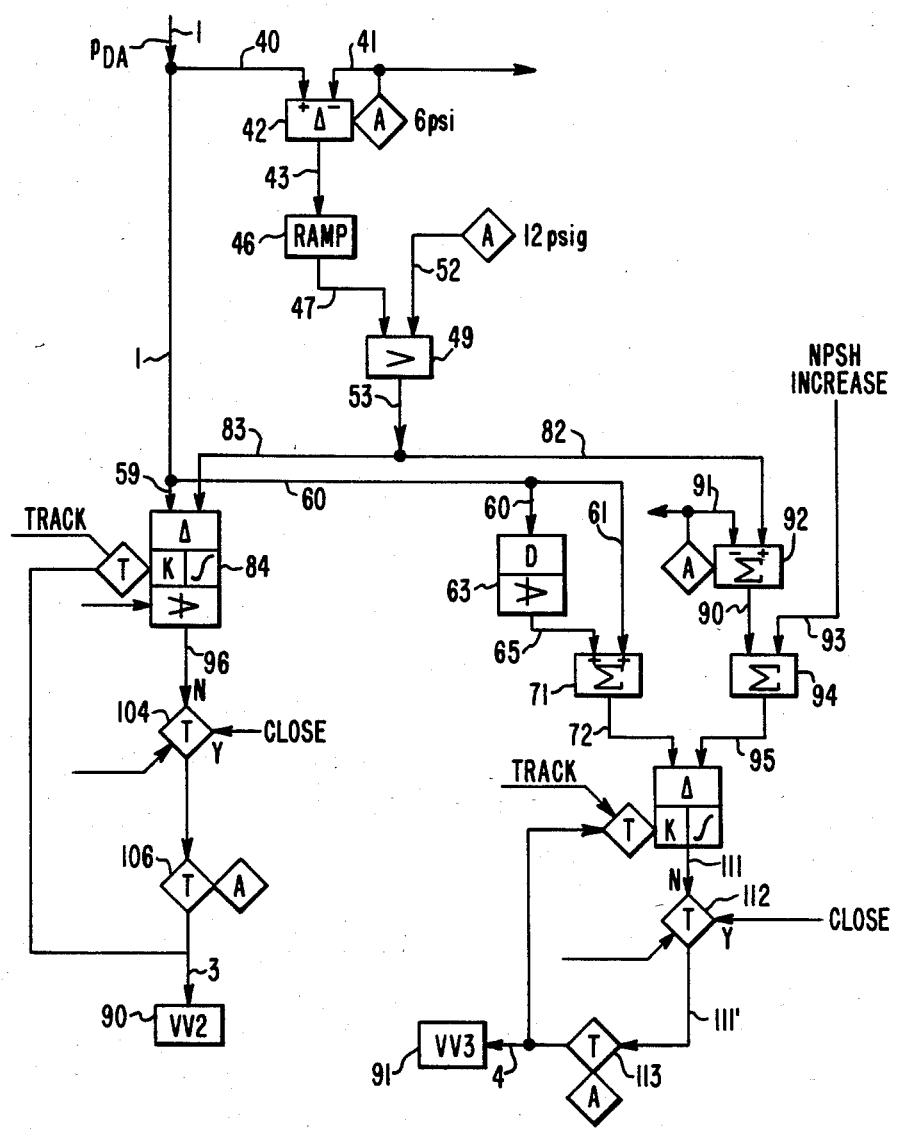
FIG. 6 is electrical circuitry as can be used in the preferred embodiment of the invention for controlling either of, or both, the flows from the economizer and the pegging heat source to establish proper pressure prior to being able to switch to extracted steam as a source of heat for the deaerator.

An implementation of the control approach illustrated by FIG. 5 is illustratively shown in FIG. 6. According to the present invention adaptive control on either valve VV2, or valve VV3, or both, is performed on the basis of actual pressure $p_{DA}$, sensed by pressure transducer 520 (FIG. 3A) which is derived on line 1, and of an assigned pressure established by a setpoint on line 2. Adaptive pressure control by the pressure controller (PCT in FIG. 4) is forcing the actual pressure build-up by the economizer to follow any increase of $p_{DA}$ at a fast rate but in accordance with a varying reference which is somewhat lower (curve (A)) than the upward trajectory of $p_{DA}$ (curve (C)) in the start-up illustration, (however, it may be any pressure increase occurring in the course of the plant operation). Nevertheless, such assigned pressure is at least the initial setpoint limit (25 psi in FIG. 5). However, when $p_{DA}$ decreases, the rate of decrease of the controlling force established by controller PCT is reduced so that actual pressure $p_{DA}$ decreases less rapidly (curve (E)) than it would without such adaptive control of valve VV2 (curve (C)). As to the backup heat source (pegging in this instance) it has the same adaptive control effect through the high pressure evaporator recirculating valve VV3, but with a lag defined by the translation between curves (A) and (B) in the case illustrated by FIG. 5, illustratively 4 psig less than the setpoint for the economizer.

Thus, the sensed pressure signal $p_{DA}$ for the deaerator on line 1 is applied: (1) for valve VV2 via line 59 to a proportional and integral controller 84 after subtraction from a signal on line 83 derived from line 53 as explained hereinafter; (2) for valve VV3 via line 60 to a differentiator 63 providing on line 65 the rate of change of the pressure sensed, and via line 61, the signals of lines 65 and 61 being applied in turn to a summer 71 providing a signal on line 72 to the pegging valve controller 87.

The signal of line 1 is also applied by line 40 to a subtractor 42 where it is reduced by the amount set on line 41, namely 5 psi (or 6 psig) which is the offset of curve (A) in relation to curve (C) of FIG. 5, in the illustration chosen. Thus, at the output is derived on line 43 a signal representing ($p_{DA}$-5 psi). This signal is applied to a ramp 46 characterized in that its rate is high when going up, but slow when going down, thereby to effect at the output on line 47 a progression like shown by curve (A) until point T and like curve (E) after point T of FIG. 5. The signal of line 47 is applied to a high select circuit 49 which also receives a minimum signal on line 52 amounting to 25 psi (or 12 psig), thus, as illustrated by the horizontal level of curve (E) where after point P it is not allowed to decrease along (A'), as shown in FIG. 5. The effective signal of line 53 is applied with the signal of lines 1 and 59 as a second input via line 83 to controller 84 for the economizer valve VV2. The control signal on the output line 96 will respond to the error between the actual signal of line 1 and the target, or setpoint value, applied on line 83, whereby valve VV2 will be controlled so as to assume an open position in relation thereto. Thus, line 96 becomes a signal on line 3 to the control system 90 of valve VV2, provided two interposed series switches 104 and 106 are in a passing position for that signal. Switch 104 can be controlled to switch to position Y which commands closing of valve VV2, as may be required in the process. Switch 106 may be switched to manual operation, in which case a feedback loop will provide tracking as shown in FIG. 6.

Considering now the side of valve VV3 for the "pegging" source of heat to the deaerator, the pressure signal of line 1 is applied by line 60 to a differentiator 63 providing on line 65 the rate of change of the signal. The pressure signal from line 60 goes also by line 61 to a summer 71 where it is added to the pressure rate signal of line 65, thereby outputting a signal on line 72 to the pegging valve controller 87. The setpoint value from line 53 is passed via line 82 to a subtractor 92 having on line 91 a subtrahend of about 5 psi value, whereby on line 90 a setpoint signal is derived for curve (B) or (E') which is offset by that amount relative to curve (A), or (E) as shown in FIG. 5. The signal of line 90 is combined with a signal on line 93 characterizing an increase in the NPDH of the boiler feed pump for protection. The signals of lines 90 and 93 thus go into a summer 94 providing an effective setpoint on line 95. The actual pressure signal of line 72 and the setpoint signal of line 95 are compared by the subtractor of the pegging valve controller 87. The proportional plus integral portion thereof provides on lines 111 and 4, a command signal for the control system 91 of pegging valve VV3 to open the valve accordingly. The signal of line 4 is effective this way unless a switch 112 is commanded to adopt position Y for which the command is to close the valve. Comes also into consideration a switch 113 intervening when the system is on manual, on which occurrence tracking is effected with a feedback loop as shown in FIG. 6.

Considering again FIG. 5, it appears that after the pressure tends to fall after point T when the heat recovery steam generator has passed the early stage e.g. when the low pressure evaporator is no longer predominant, the economizer intervenes to heat up the deaerator, following curve (E), then reaching at Q, the stage where the extraction of steam from the turbine takes over. Should however the pressure of the economizer fall, as illustrated by curve (A'), at point R the pegging valve will take over to follow (E') and again (at Q' this time) the extraction steam will take over. Should later in the operation curve (D) have a fall of pressure, the economizer, or the pegging, heat will assist in keeping the deaerator in full operation.

What is claimed is:

1. In a deaerator system including a deaerator operative on feedwater from an industrial process,
   with the provision of a first heat source from the process fluidly connected to the deaerator for providing fluid flow thereto at an operative pressure, said fluid flow being operatively controlled as a function of the load upon the occurrence of a high load condition,
   with the provision of a second heat source fluidly connected to the deaerator for providing fluid flow thereto by autocirculation, said fluid flow from the second heat source being under conditions of temperature and pressure depending upon the industrial process,
   the combination of:
   at least one additional heat source fluidly connected to the deaerator for providing fluid flow thereto before the occurrence of said high load condition;
   means for sensing pressure in said deaerator; and
   first control means responsive to said sensing means and operative on the fluid flow from said additional heat source for maintaining a minimum deaerator pressure before the occurrence of said high load condition; whereby said first control means becomes operative whenever the deaerator pressure tends to sink below said minimum.

2. The system of claim 1 with first means for establishing a reference set point for said additional heat source;
   said first control means being responsive to the difference between deaerator pressure and said reference set point and being effective to operate when deaerator pressure falls below said reference set point.

3. The system of claim 1 with means for slowing down the response of said first control means in relation to a decrease of the deaerator pressure, whereby corrective action is lengthened as a function of time.

4. The system of claim 4 with said first control means including means for detecting an increase in the deaerator pressure and for biasing said first reference set point in relation to said increase thereby to track such deaerator pressure increase.

5. The system of claim 4 with a back-up additional heat source fluidly connected to the deaerator for providing fluid flow thereto before the occurrence of said high load condition;
   with second control means operative on the fluid flow from said back-up heat source for maintaining a second minimum deaerator pressure before the occurrence of said high load condition;
   with said second control means becoming operative whenever the deaerator pressure tends to sink below said second minimum.

6. The system of claim 5 with means for establishing a second pressure reference set point for said back-up heat source, said second control means being responsive to the difference between deaerator pressure and said second pressure reference set point and being effective to operate when the deaerator pressure falls below said second reference set point.

7. The system of claim 6 with means for slowing down the response of said second control means in relation to a decrease of the deaerator pressure when said second control means operate, whereby corrective action by said second control means is lengthened as a function of time.

8. The system of claim 7 with said second control means including means for detecting an increase in the deaerator pressure and for biasing said second pressure reference set point in relation to said increase thereby to track such deaerator pressure increase when said second control means is operative.

9. The system of claim 8 with the deaerator system being part of a combined cycle system including a steam turbine and a combustion gas turbine, a heat recovery steam generator being associated with said combination gas turbine, the feedwater being derived from the steam turbine condenser, the second heat source being a low pressure evaporator in said heat recovery steam generator, said first heat source being steam extraction from the steam turbine at high load, said one additional source being the economizer and said back-up source being pegging from the high pressure drum of said heat recovery steam generator.

* * * * *